US007938050B2

(12) United States Patent
Gehret

(10) Patent No.: US 7,938,050 B2
(45) Date of Patent: May 10, 2011

(54) FINE ADJUSTMENT MECHANISM FOR PRECISION MITER CUTS

(75) Inventor: Robert S. Gehret, Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 390 days.

(21) Appl. No.: 11/846,165

(22) Filed: Aug. 28, 2007

(65) Prior Publication Data

US 2008/0053285 A1   Mar. 6, 2008

(51) Int. Cl.
 *B23D 33/02* (2006.01)
(52) U.S. Cl. .............. 83/471; 83/471.3; 83/490; 83/581
(58) Field of Classification Search .................. 83/471.3, 83/471, 477.1, 581, 522.15, 522.11, 522.22, 83/490, 486, 486.1, 488, 489
 See application file for complete search history.

(56) References Cited

U.S. PATENT DOCUMENTS

| 3,049,193 | A | * | 8/1962 | Ingersoll | 188/69 |
| 3,085,452 | A | * | 4/1963 | Thompson | 74/822 |
| 4,011,782 | A | * | 3/1977 | Clark et al. | 83/471.3 |
| 5,249,496 | A | * | 10/1993 | Hirsch et al. | 83/471.3 |
| 5,862,732 | A | * | 1/1999 | Itzov | 83/471.3 |
| 6,513,412 | B2 | * | 2/2003 | Young | 83/471.3 |
| 2004/0154448 | A1 | * | 8/2004 | Romo et al. | 83/471.3 |
| 2005/0284276 | A1 | * | 12/2005 | Talesky et al. | 83/471.3 |

* cited by examiner

*Primary Examiner* — Boyer D Ashley
*Assistant Examiner* — Omar Flores-Sánchez
(74) *Attorney, Agent, or Firm* — Adan Ayala

(57) ABSTRACT

A miter saw has a base assembly, a table assembly rotatably disposed on the base assembly, a support housing connected to the table assembly, and a saw assembly pivotably attached to the support housing. The saw assembly is pivotable downwardly for cutting a workpiece disposed on the table assembly. The saw has a miter lock assembly including a shoe assembly connected to the table housing and movable between a first position not contacting the base assembly and a second position contacting the base assembly. The shoe assembly has a movable shoe for adjusting the angular position of the table assembly relative to the base assembly.

18 Claims, 3 Drawing Sheets

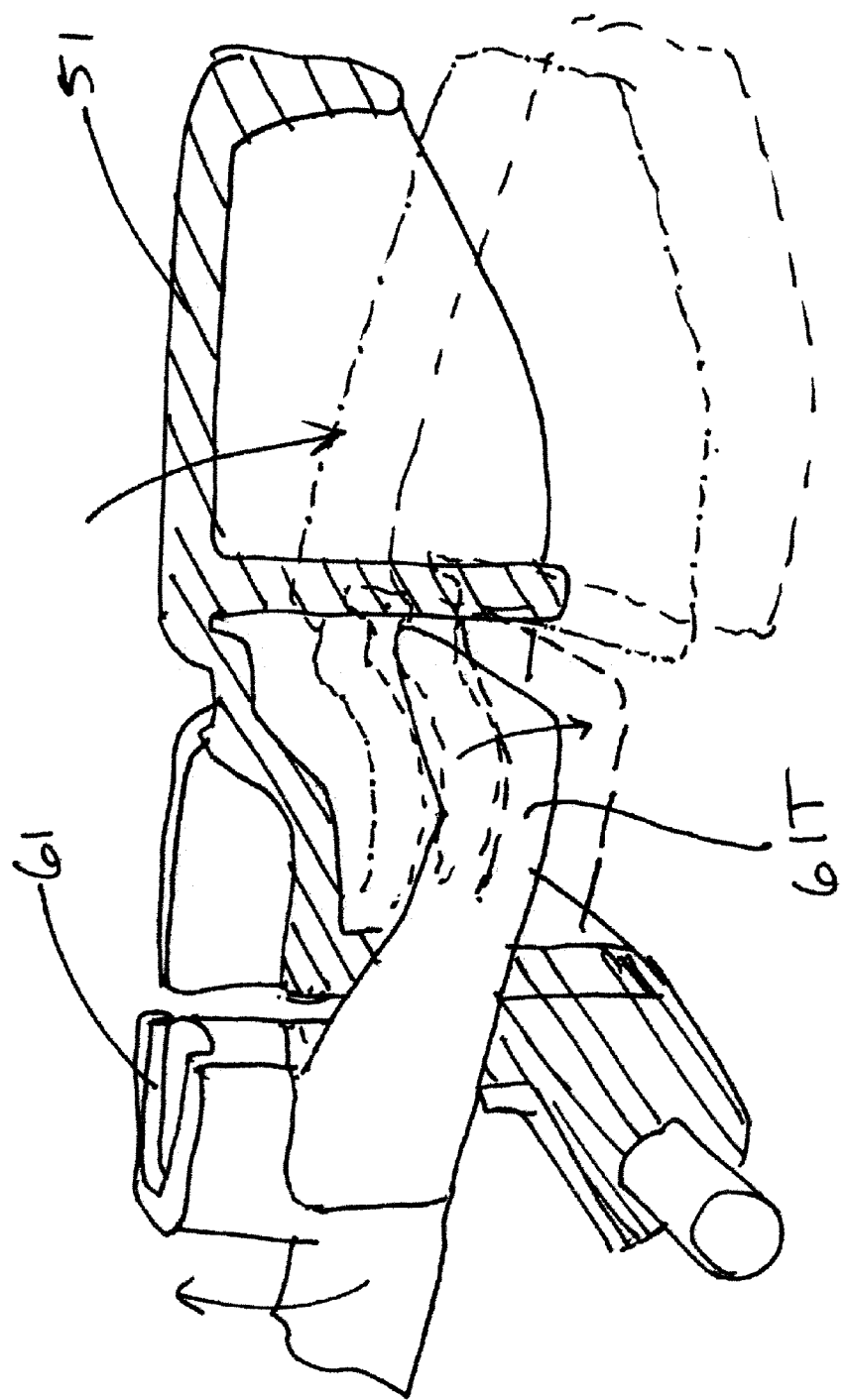

FINE ADJUSTMENT MECHANISM FOR PRECISION MITER CUTS

FIELD

This specification relates to miter saws and more specifically to a miter saw having a fine adjustment mechanism for miter cuts.

BACKGROUND

Referring to FIG. 1, a miter saw typically has a base assembly 10, a table assembly 20 rotatably attached to the base assembly 10, a support housing 30 connected to the table assembly 20, and a saw assembly 40 pivotally connected to the support housing 30. The saw assembly 40 may include an arm 41 pivotally connected to support housing 30, an upper blade guard 42 connected to arm 41, a motor (not shown) supported by arm 41 and/or upper blade guard 42, a blade 43 driven by the motor, and a lower blade guard 44 pivotally attached to the upper blade guard.

A fence assembly 15 is typically attached to base assembly 10. With such construction, a user can place a work piece against fence assembly 15 and table assembly 20 for cutting. The user can make a miter cut by rotating table assembly 20 relative to base assembly 10.

If support housing 30 is pivotally attached to table assembly 20, the user can rotate support housing 30 relative to table assembly 20 and/or base assembly 10, tilting the blade 43 relative to the table assembly 20, thus changing the blade's bevel angle. A cut made with the blade 43 tilted at an angle (and perpendicular to the fence assembly 15) is known as a "bevel cut." A cut made with the blade 43 set to both an angle relative to the fence assembly 15 (miter angle) and an angle relative to the base assembly 10 (bevel angle) is known as a "compound cut."

Miter saws typically include a detent system 12 that allows the table assembly 20 and the blade 43 to be preset to specific angles relative to the fence assembly 15. A detent system 12 provides an accurate means to preset and reset the saw to make the most popular cuts. Such detent system 12 may include a detent plate 13 with detent recesses formed thereon. Alternatively, the detent recesses may be formed on base assembly 10. Such recesses can receive a spring-biased detent, fixing the position of table assembly 20 relative to the fence assembly 15. Persons skilled in the art are directed to US Published Application No. 2005/0284276, which is hereby fully incorporated by reference, for further information on such detent systems, operation thereof, and miter lock mechanisms.

If a user wants to preset the miter saw for an angle cut not provided by the detent system, the user would allow the spring-loaded detent to rest against the detent plate 13 and/or the base assembly 10 outside of the detent recesses and engage the miter lock mechanism. Due to the interaction between the spring-loaded detent and the detent recesses, however, the prior art arrangements do not allow for a fine adjustment that is near one of the predetermined detent positions.

Some solutions have been proposed to solve this problem. US Published Application No. 2004/0154448, for example, discloses a mechanism for adjusting the position of the detent engaging the recesses. However, such mechanism is difficult to adjust and to reset to the original position.

Similarly, US Published Application Nos. 2005/0284276, 2005/0262984 and 2006/0016310 disclose rack-and-pinion and/or worm drive mechanisms for adjusting the position of the table assembly relative to the base assembly. However such mechanisms are difficult to reset to the original position.

SUMMARY

A miter saw comprising a base assembly, a table assembly rotatably disposed on the base assembly, a support housing connected to the table assembly, a saw assembly pivotably attached to the support housing, the saw assembly being pivotable downwardly for cutting a workpiece disposed on the table assembly, a miter lock assembly including a pivotable shoe assembly connected to the table housing and movable between a first position not contacting the base assembly and a second position contacting the base assembly, the shoe assembly comprising a movable shoe for adjusting the angular position of the table assembly relative to the base assembly.

BRIEF DESCRIPTION OF THE FIGURES

The accompanying drawings illustrate preferred embodiments according to the practical application of the principles thereof, and in which:

FIG. 5 is a cross-sectional view along line V-V of FIG. 3.

DETAILED DESCRIPTION

Figure 1:
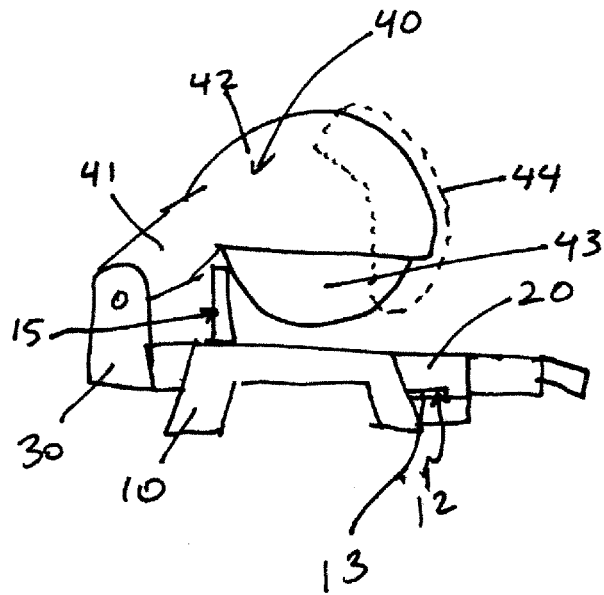
FIG. 1 illustrates a prior art miter saw.

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring first to FIGS. 1-4, base assembly 10 preferably supports a detent plate 13 with detent recesses 13R. Table assembly 20 preferably carries a miter lock assembly 50, a miter detent mechanism 60, and a fine adjust mechanism 70.

Miter lock assembly 50 preferably includes miter lock handle 51 pivotally attached to table assembly 20 and a miter lock shaft 52. Miter lock shaft 52 is preferably connected to miter lock handle 51 so that it moves towards base assembly 10 when miter lock handle 51 is rotated downwardly.

A cam or eccentric 51C may be disposed on miter lock handle 51 to contact and push miter lock shaft 52 towards the base assembly 10. Persons skilled in the art will recognize that eccentric 51C may be replaced with other mechanisms that can convert the rotational motion of miter lock handle 51 into a linear motion for miter lock shaft 52.

Miter lock shaft 52 preferably pushes a shoe assembly 53 towards base assembly 10. Shoe assembly 53 preferably includes a housing 53H pivotally attached to table assembly 20 via pivot 53P.

A shoe 53S may be slidably disposed within housing 53H. Shoe 53S may have knurling or other textures thereon to enhance the friction contact between shoe 53S and base assembly 10. Shoe 53S may have a slot 53SS that receives a retainer 53R attached to housing 53H. Bolts 53B may connect retainer 53R to housing 53H.

A spring 54 may be disposed between table assembly 20 and housing 53H to bias housing 53H (and thus shoe assembly 53) away from base assembly 10.

The operation of miter lock assembly 50 will be discussed below.

The miter detent mechanism 60 preferably includes a detent member 63 which is pivotally attached to table assembly 20. Detent member 63 preferably carries a detent 63D that engages a recess 13R. A spring 64 may be disposed between detent member 63 and table assembly 20 to bias detent member 63 towards detent plate 13 (and thus biasing detent 63D towards recess 13R). Persons skilled in the art will recognize that detent member 63 may be made of spring metal, thus combining the functions of detent member 63 and spring 64.

Detent member 63 (and thus detent 63D) may be lifted away from detent plate 13 and recess 13R via a lever 62 which is preferably pivotally attached to table assembly 20. Lever 62 may have a button 61 which extends beyond the table assembly 20, allowing the user to push downwardly button 61, causing detent member 63 (and thus detent 63D) to be lifted away from detent plate 13 and recess 13R.

Referring to FIG. 5, button 61 and/or lever 62 may have a tongue 61T extending therefrom. Tongue 61T may be disposed underneath miter lock handle 51.

The operation of miter detent assembly 60 will be discussed below.

Figure 2:
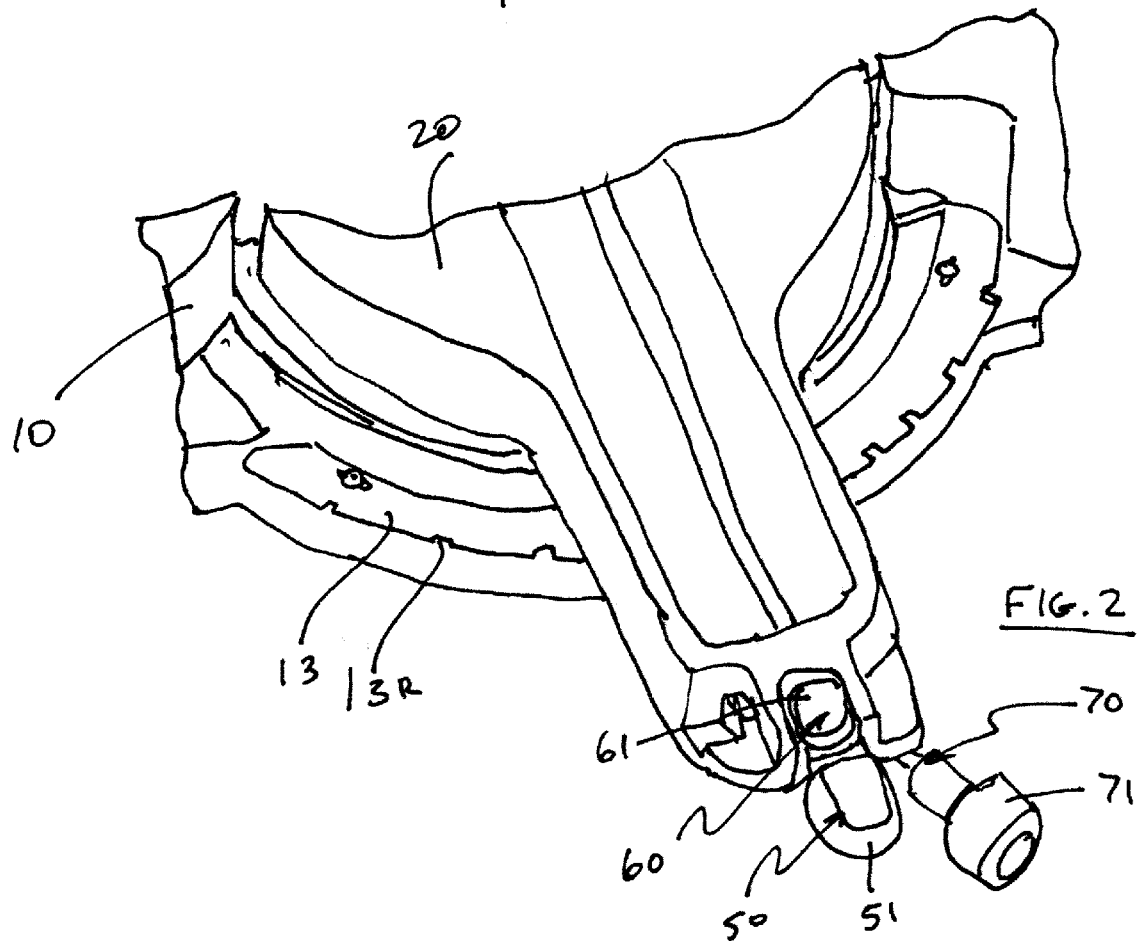
FIG. 2 is a partial perspective view of a miter saw according to the invention.
Figure 3:
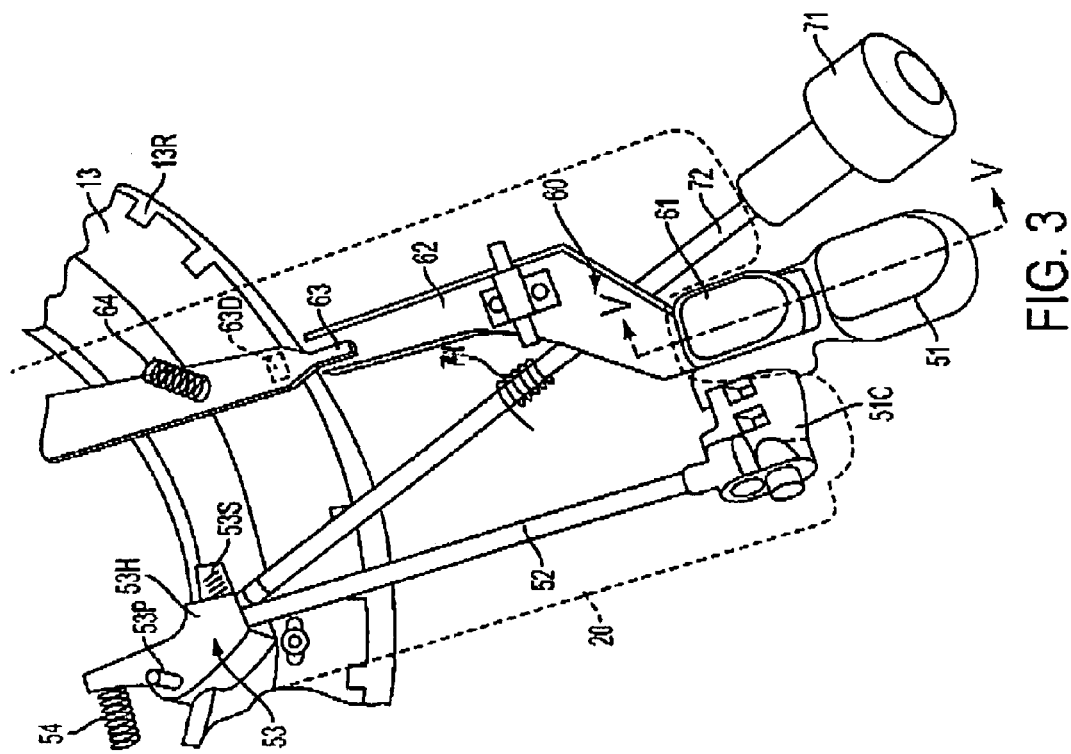
FIG. 3 is a partial perspective view of the miter saw of FIG. 2.
Figure 4:
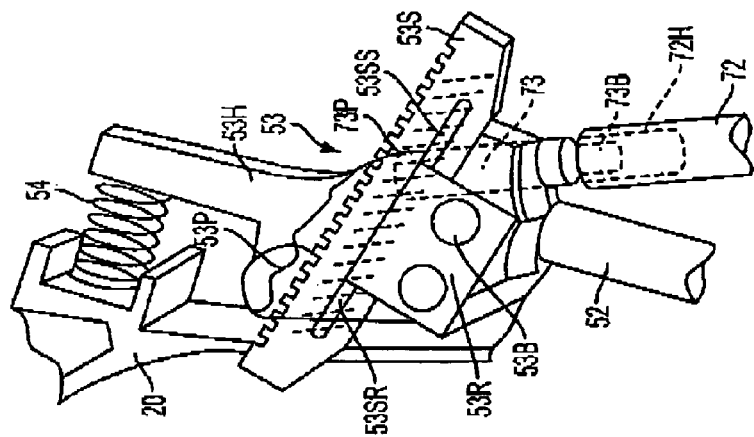
FIG. 4 is a partial top plan view of a shoe assembly according to the invention.

Referring to FIGS. 2-4, the fine adjust mechanism 70 preferably includes a fine adjust knob 71, a fine adjust shaft 72 attached to fine adjust knob 71, and a pinion assembly 73.

Pinion assembly 73 may have at one end a pinion 73P meshing with a rack 53SR disposed on shoe 53S. At the other end, pinion assembly 73 may have a hex ball 73B. Fine adjust shaft 72 preferably has a hex socket 72H disposed at one end to engage hex ball 73B. Such connection creates a hex ball joint, which preferably allows axial movement between pinion assembly 73 and fine adjust shaft 72, while allowing variance in the angle created between pinion assembly 73 and fine adjust shaft 72.

A spring 74 may be attached to table assembly 20 and fine adjust shaft 72. Spring 74 may bias fine adjust shaft 72 towards a "neutral" rotational position. Accordingly, when the fine adjust shaft 72 is rotated in either direction, spring 74 may be wound or unwound, creating such bias, so that when the torque on fine adjust shaft 72 is released, the spring 74 returns fine adjust shaft 72 to the original neutral position.

With such construction, a user can adjust the miter angle as follows: the user pushes button 61, rotating lever 62 and lifting detent member 63 (and thus detent 63D) off detent plate 13, allowing the user to rotate table assembly 20 relative to base assembly 10. When the desired miter angle is obtained, the user releases button 61, allowing detent member 63 (and thus detent 63D) to contact detent plate 13 and possibly engage recess 13R.

The user then locks the miter angle by rotating miter lock handle 51 downwardly. As miter lock handle 51 is rotated, miter lock shaft 52 pushes housing 53H towards base assembly 10, so that shoe 53S contacts base assembly 10, fixing the miter angle. Persons skilled in the art will recognize that the friction developed between shoe 53S and housing 53H will preferably fix the angular position of the table assembly 20 relative to the base assembly 10. In addition, as miter lock handle 51 is rotated, tongue 61T causes lever 62 to rotate, lifting detent member 63 (and thus detent 63D) off detent plate 13. In other words, the detent 63D is disengaged when the miter lock assembly 50 is engaged.

Persons skilled in the art will note that it is preferably that the shoe 53S comes into contact with table assembly 20 before tongue 61T comes into contact with miter lock handle 51. In this manner, the table assembly 20 will be partially locked, and thus held in place, before the detent 53D is lifted out of the detent recess 13R.

If the user wants to finely adjust the miter angle without disengaging miter lock assembly 50 and readjusting the miter angle, the user can rotate the fine adjust knob 71, which causes the fine adjust shaft 72 and pinion assembly 73 to rotate. Persons skilled in the art will recognize that the user must supply enough torque to overcome the friction force developed between shoe 53S and housing 53H. As pinion assembly 73 rotates, the pinion 73P meshing with rack 53SR causes shoe 53S to move sideways, causing table assembly 20 to move relative to base assembly 10, without disengaging shoe 53S (and thus shoe assembly 53) from base assembly 10.

When the user wants to change the miter angle, the user can rotate miter lock handle 51 upwards, moving miter lock shaft 52 away from base assembly 10, allowing spring 54 to rotate shoe assembly 53 away from base assembly 10. Persons skilled in the art will recognize that, when shoe assembly 53 is rotated away from base assembly 10, shoe 53S does not contact base assembly 10. Such persons should also recognize that, because shoe 53S does not contact base assembly 10, rotating fine adjust knob 71 will not affect the miter angle. Persons skilled in the art should also recognize that, when the user unlocks miter lock handle 51, and shoe 53S does not contact base assembly 10, spring 73 can cause fine adjust shaft 72 to rotate and return to the original neutral position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A miter saw comprising:
  a base assembly;
  a table assembly rotatably disposed on the base assembly;
  a support housing connected to the table assembly;
  a saw assembly pivotably attached to the support housing, the saw assembly being pivotable downwardly for cutting a workpiece disposed on the table assembly; and
  a miter lock assembly including a miter lock handle pivotally attached to the table assembly and is movable between a first position where a rotational position of the table assembly relative to the base assembly is fixed and a second position where the rotational position of the table assembly relative to the base assembly is not fixed, a first shaft connected to the miter lock handle so that the first shaft moves when the miter lock handle is moved, a shoe assembly connected to the table housing and movable between a first position not contacting the base assembly and a second position contacting the base assembly, the shoe assembly comprising a movable shoe for adjusting the angular position of the table assembly relative to the base assembly, a first spring disposed between the shoe assembly and the table assembly for biasing the shoe assembly towards the first position, and a second shaft connected to the shoe;
  wherein the shoe is movable relative to the second shaft when the shoe assembly is in the second position.

2. The miter saw of claim 1, wherein the first shaft is connected to the shoe assembly.

3. The miter saw of claim 2, wherein the first shaft moves the shoe assembly to the second position.

4. The miter saw of claim 1, further comprising a detent member attached to the table assembly movable between a first position engaging a recess disposed in the base assembly, and a second position not engaging the recess.

5. The miter saw of claim 4, further comprising a spring for biasing the detent member towards the first position.

6. The miter saw of claim 4, wherein the detent member is moved to the second position when the miter lock handle is moved to the first position.

7. The miter saw of claim 1, wherein the second shaft has a pinion meshing with a rack on the shoe.

8. The miter saw of claim 1, further comprising a knob on the second shaft.

9. The miter saw of claim 1, wherein a second spring is connected to the second shaft.

10. A miter saw comprising:
    a base assembly;
    a table assembly rotatably disposed on the base assembly;
    a support housing connected to the table assembly;
    a saw assembly pivotably attached to the support housing, the saw assembly being pivotable downwardly for cutting a workpiece disposed on the table assembly; and
    a miter lock assembly including a shoe assembly connected to the table housing and movable between a first position not contacting the base assembly and a second position contacting the base assembly, the shoe assembly comprising a movable shoe for adjusting the angular position of the table assembly relative to the base assembly, and a first shaft connected to the shoe, the first shaft having a pinion meshing with a rack on the shoe;
    wherein the shoe is movable relative to the first shaft when the shoe assembly is in the second position.

11. The miter saw of claim 10, further comprising a miter lock handle pivotally attached to the table assembly and is movable between a first position where a rotational position of the table assembly relative to the base assembly is fixed and a second position where the rotational position of the table assembly relative to the base assembly is not fixed.

12. The miter saw of claim 11, further comprising a second shaft connected to the miter lock handle so that the second shaft moves when the miter lock handle is moved.

13. The miter saw of claim 12, wherein the second shaft is connected to the shoe assembly.

14. The miter saw of claim 13, wherein the second shaft moves the shoe assembly to the second position.

15. The miter saw of claim 10, further comprising a detent member attached to the table assembly movable between a first position engaging a recess disposed in the base assembly, and a second position not engaging the recess.

16. The miter saw of claim 15, further comprising a spring for biasing the detent member towards the first position.

17. The miter saw of claim 15, wherein the detent member is moved to the second position when the miter lock handle is moved to the first position.

18. The miter saw of claim 10, further comprising a spring disposed between the shoe assembly and the table assembly for biasing the shoe assembly towards the first position.

\* \* \* \* \*